(12) United States Patent
Parker

(10) Patent No.: US 8,919,703 B2
(45) Date of Patent: Dec. 30, 2014

(54) HINGE SEALING ELEMENT AND AN ASSEMBLY INCLUDING SAID ELEMENT

(75) Inventor: Simon John Parker, Bristol (GB)

(73) Assignee: Airbus Operations Limited, Bristol (GB)

( * ) Notice: Subject to any disclaimer, the term of this patent is extended or adjusted under 35 U.S.C. 154(b) by 1267 days.

(21) Appl. No.: 12/662,955

(22) Filed: May 13, 2010

(65) Prior Publication Data
US 2010/0288887 A1    Nov. 18, 2010

(30) Foreign Application Priority Data

May 15, 2009    (GB) .................................. 0908370.0

(51) Int. Cl.
*B64C 3/50* (2006.01)
*B64C 3/36* (2006.01)
*B64C 7/00* (2006.01)
*B64C 9/02* (2006.01)

(52) U.S. Cl.
CPC ...... *B64C 7/00* (2013.01); *B64C 9/02* (2013.01); *Y02T 50/32* (2013.01); *Y02T 50/44* (2013.01)
USPC ............ 244/215; 244/130; 244/131; 244/213

(58) Field of Classification Search
USPC ................. 244/211, 212, 213, 215, 130, 131
See application file for complete search history.

(56) References Cited

U.S. PATENT DOCUMENTS

| | | | | |
|---|---|---|---|---|
| 2,334,975 A * | 11/1943 | Williams | ...................... | 244/216 |
| 2,368,702 A * | 2/1945 | Bourne | ........................ | 244/130 |
| 2,403,770 A * | 7/1946 | Van Zelm | .................... | 244/90 R |
| 2,404,895 A * | 7/1946 | Zap | .............................. | 244/215 |
| 4,427,169 A * | 1/1984 | Brown | ......................... | 244/219 |
| 4,460,138 A * | 7/1984 | Sankrithi | ..................... | 244/215 |
| 4,553,722 A * | 11/1985 | Cole | ............................ | 244/219 |
| 4,962,902 A * | 10/1990 | Fortes | .......................... | 244/215 |
| 5,222,692 A * | 6/1993 | Glowacki | .................... | 244/53 R |
| 5,388,788 A * | 2/1995 | Rudolph | ....................... | 244/215 |
| 5,915,653 A * | 6/1999 | Koppelman | ............... | 244/129.1 |
| 6,729,583 B2 * | 5/2004 | Milliere | ........................ | 244/213 |

(Continued)

FOREIGN PATENT DOCUMENTS

| | | |
|---|---|---|
| GB | 1 495 751 | 12/1977 |
| GB | 2 238 026 | 5/1991 |

OTHER PUBLICATIONS

Search Report for GB 0908370.0 dated Sep. 11, 2009.

*Primary Examiner* — Timothy D Collins
*Assistant Examiner* — Steven Hawk
(74) *Attorney, Agent, or Firm* — Nixon & Vanderhye P.C.

(57) ABSTRACT

A hinge sealing element to substantially prevent airflow between an edge of a moveable aero surface structure and an edge of a fixed skin of an aircraft wing in the vicinity of the ribs to which the moveable aero surface structure is pivotally mounted is disclosed. The hinge sealing element comprising a deformable elongate, resiliently flexible strip having an upper face to contact a trailing edge of a fixed skin and one end attachable to a moveable aero surface structure such that said strip extends from an upper surface of said moveable aero surface structure beyond its leading edge and into a space between the edge of the fixed skin and the rib of the aircraft wing to a second, free end. The strip is configured such that it deforms during pivotal movement of the moveable aero surface structure to maintain contact between the upper face of the flexible element and the trailing edge of the fixed skin.

16 Claims, 6 Drawing Sheets

(56) References Cited

U.S. PATENT DOCUMENTS

| | | | |
|---|---|---|---|
| 6,877,695 B2 * | 4/2005 | Eveker et al. | 244/129.5 |
| 6,966,189 B2 * | 11/2005 | Lapergue et al. | 60/771 |
| 7,051,982 B1 * | 5/2006 | Johnson | 244/215 |
| 7,611,099 B2 * | 11/2009 | Kordel et al. | 244/215 |
| 7,669,800 B2 * | 3/2010 | Martin Hernandez | 244/130 |
| 7,815,147 B2 * | 10/2010 | Martin Hernandez | 244/130 |
| 8,556,214 B2 * | 10/2013 | McAlinden et al. | 244/130 |
| 2004/0004162 A1 * | 1/2004 | Beyer et al. | 244/216 |
| 2006/0145012 A1 * | 7/2006 | Hernandez | 244/130 |
| 2007/0252040 A1 * | 11/2007 | Kordel et al. | 244/123.1 |
| 2007/0257151 A1 * | 11/2007 | Mindermann et al. | 244/130 |
| 2008/0029647 A1 * | 2/2008 | Hernandez | 244/130 |
| 2008/0121758 A1 * | 5/2008 | Hernandez | 244/130 |

* cited by examiner

HINGE SEALING ELEMENT AND AN ASSEMBLY INCLUDING SAID ELEMENT

This application claims priority to GB 0908370.0 filed 15 May 2009, the entire contents which is hereby incorporated by reference.

INTRODUCTION

The present invention relates to a hinge sealing element and to an assembly that includes the hinge sealing element of the invention. More specifically, the invention relates to a sealing element to substantially prevent airflow between a leading edge of a moving aero surface structure of a wing, such as a spoiler or aileron, and an edge of a fixed skin of an aircraft wing in the vicinity of the ribs to which the moving surface structure is pivotally mounted.

BACKGROUND

A spoiler is a type of moving surface structure which is used to break up the airflow around an aerodynamic surface such as an aircraft wing, in order to slow the movement of the aircraft through the air or to decrease the lift on the surface. On the majority of large aircraft, conventional spoilers are stowed flat to the wing outer mould line during cruise and only deploy upwards into the air flow to spoil lift so that the aircraft looses height during landing or descent. Usually, the spoilers deploy through an angle of up to 55 degrees to spoil lift.

Until recently, spoilers have only been used to decrease lift. However, more recent developments in aircraft design now also require spoilers to droop to aid high lift devices on the trailing edge of the wings, such as the flaps.

Although spoilers may only droop by an angle of up to 15 degrees to aid lift, providing for the droop function results in gaps being formed in the top skin surface between the spoiler and the trailing edge of the fixed wing at all the positions where the spoiler is hingedly mounted to the fixed wing during cruise. These gaps result in the generation of excessive noise and reduce efficiency which is unacceptable, especially now that there are increasingly more stringent requirements for noise reduction in populated areas as well as demands for more efficient aircraft. In larger aircraft the additional noise generated as a result of the formation of gaps in the hinge area is particularly noticeable, as such aircraft can have up to seven spoilers per wing with a minimum of two hinges per spoiler. Sealing in the hinge area between the spoilers and the fixed wing has therefore become a more critical aspect in aircraft wing design.

Although conventional elastomeric materials are often employed for the purpose of sealing between a spoiler and the fixed wing, it has been found that this type of seal is not feasible considering the range of movement throughout which sealing is required when a spoiler is required to droop to aid lift in addition to its normal function of raising to spoil lift.

The present invention therefore seeks to provide improved sealing in the hinge area between a moving aero surface structure and a fixed wing to improve efficiency and reduce noise during take-off and landing and with the aim of preventing or reducing bleed through of air from the high pressure below the wing to the low pressure above the wing.

The present invention may also provide an overall weight reduction to an aircraft. In current designs, the moving aero surface structure is provided with hinge lugs that cooperate with a mating clevis on the fixed wing structure. However, the present invention potentially allows for the hinge lugs to be provided on the fixed structure and the mating clevis provided on the moving aero structure. This results in a much better load introduction into the aero surface and therefore facilitates a much more lightweight overall design for the aircraft. When the hinge lugs are provided on the fixed structure without the improved sealing arrangement provided by embodiments of the present invention, the exposed slots in the upper aero surface are much wider and so any benefit obtained as a consequence of the weight reduction would be outweighed by the inefficiency caused by the wider slots.

SUMMARY OF THE INVENTION

According to the invention, there is provided a hinge sealing element to substantially prevent airflow between a leading edge of a moveable aero surface structure and an edge of a fixed skin of an aircraft wing in the vicinity of the ribs to which the aero surface structure is pivotally mounted, the hinge sealing element comprising a deformable elongate, resiliently flexible strip having an upper face to contact an edge of a fixed skin and one end attachable to a moveable aero surface structure such that said strip extends from an upper surface of said moveable aero surface structure beyond its leading edge and into a space between the trailing edge of the fixed skin and the rib of the aircraft wing to a second, free end, the strip being configured such that it deforms during pivotal movement of the moveable aero surface structure to maintain contact between the upper face of the flexible strip and the trailing edge of the fixed skin.

In one embodiment, the hinge sealing element is formed from a plastic material. Alternatively, it can be formed from metal such as a high chromium heat treated stainless steel or, from a composite material.

According to the invention, there is also provided an assembly to substantially prevent airflow between a leading edge of a moveable aero surface structure and an edge of a fixed skin of an aircraft wing in the vicinity of the ribs to which the moveable aero surface structure is pivotally mounted, including the hinge sealing element according to any preceding claim.

The present invention provides improved sealing between the edge of the moveable aero surface structure and the edge of the fixed wing in the region where the moveable aero surface structure is hingedly mounted to the fixed wing, throughout the full range of deployment of the moveable aero surface structure.

In a preferred embodiment the assembly comprises a guide element mountable on an upper surface of a rib of the fixed wing of an aircraft to guide sliding movement of the hinge sealing element in the space between the trailing edge of the fixed skin and the rib of the aircraft wing during pivotal movement of the aero surface structure.

In one embodiment, the guide element comprises a roller or skid mounted for rotation in a supporting structure on the upper surface of said rib, said roller or skid being positioned so as to contact the underside of the hinge sealing element.

Preferably, a cap is attached to the free end of the hinge sealing element to reduce friction between the sealing element and the fixed wing where the free end of the hinge sealing element contacts the fixed wing during pivotal movement of the aero surface structure. Or as an alternative the material itself could be folded over on itself to provide for a 'safe edge'.

In an alternative embodiment, the guide element comprises an elongate channel member on the upper surface of the fixed rib, said channel being configured to slideably receive the free end of the hinge sealing element.

The channel member may comprise a guide pin positioned so that the sealing element slides into the channel beneath the guide pin.

In a preferred embodiment, the fixed wing includes a secondary sealing element protruding from its trailing edge, said secondary sealing element being biased into contact with an upper surface of the hinge sealing element to form a sliding seal therebetween According to another aspect of the invention, there is provided a wing for an aircraft comprising a fixed wing portion and a moveable aero surface structure pivotally mounted to said fixed wing portion, including the assembly according to the invention.

In a preferred embodiment, the moveable aero surface structure is a spoiler. However, said moveable aero surface structure can also be an aileron or a flap hinge fairing.

BRIEF DESCRIPTION OF THE DRAWINGS

Embodiments of the invention will now be described, by way of example only, and with reference to the accompanying drawings, in which.

DESCRIPTION OF THE PREFERRED EMBODIMENTS

Figure 1:
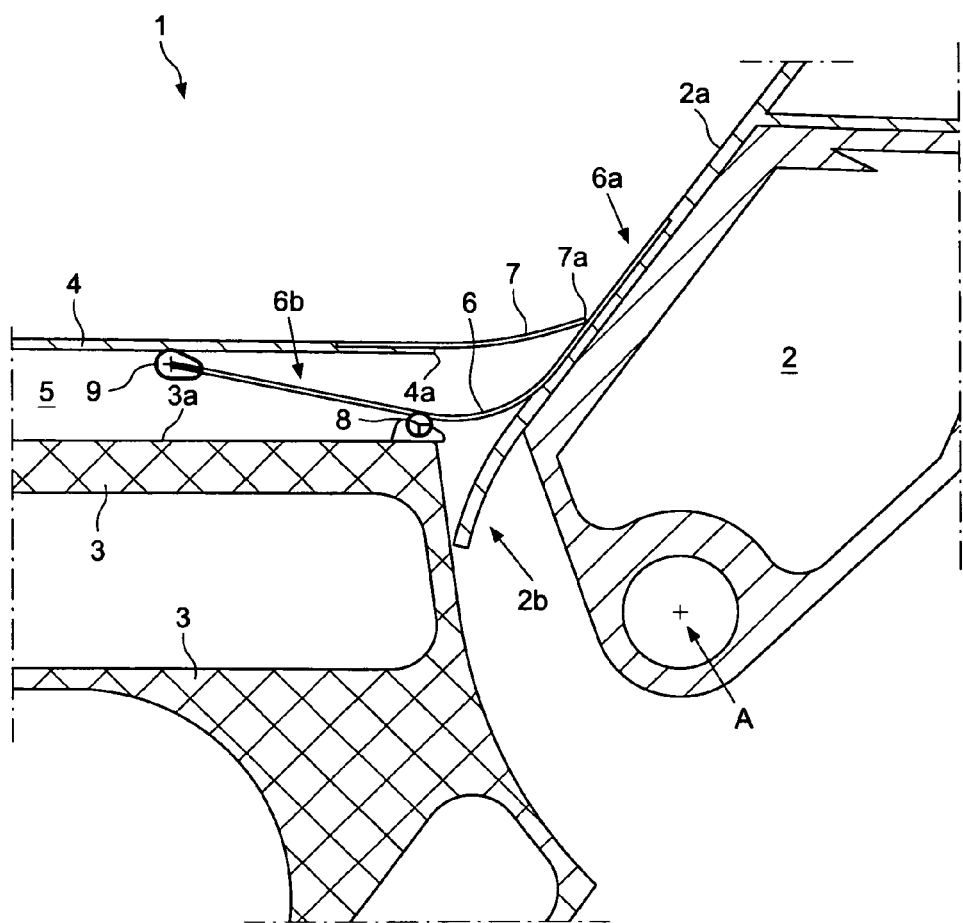
FIG. 1 shows a partial cross-sectional view through a wing of an aircraft in the vicinity of a hinge between a spoiler and the fixed wing, with the spoiler shown in its fully raised position to decrease lift and with a spoiler hinge seal of the invention sealing the gap between the fixed wing and the top skin of the spoiler.
Figure 2:
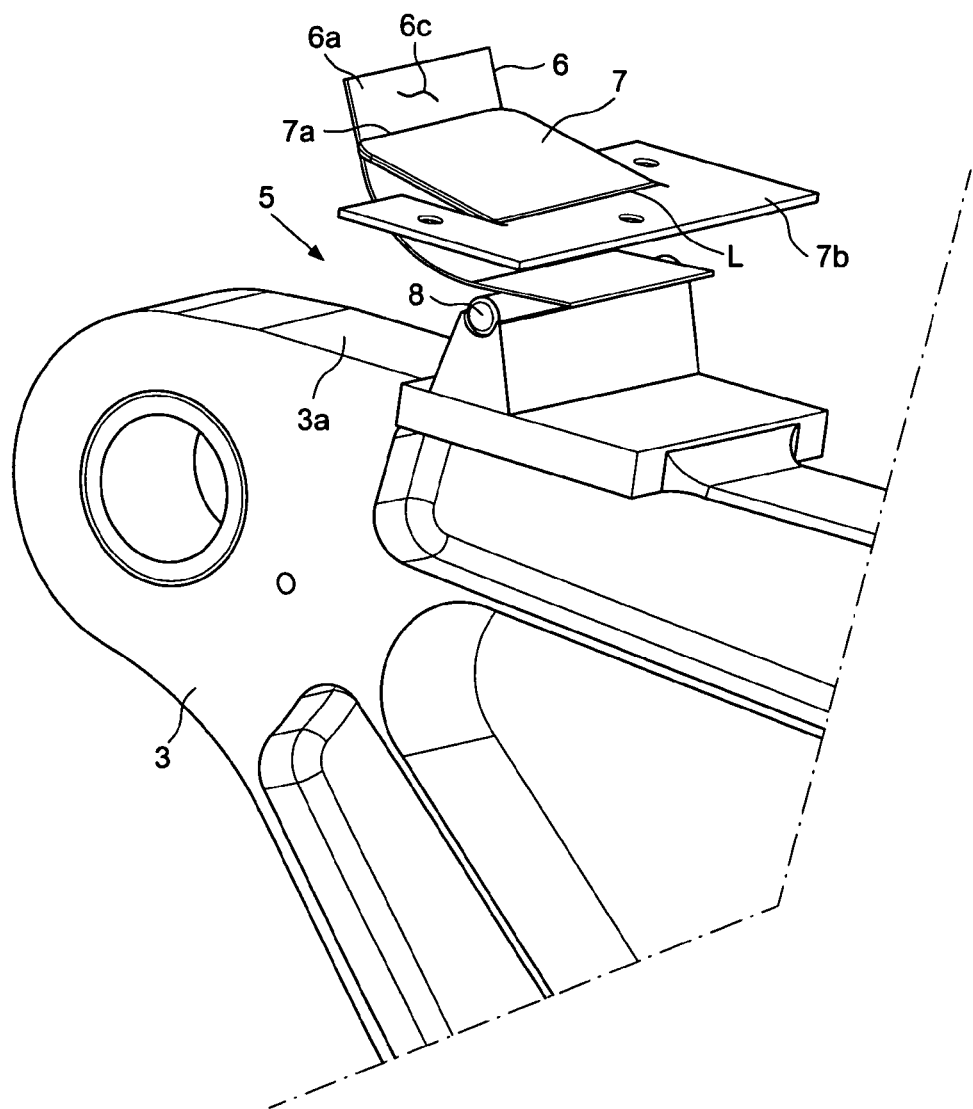
FIG. 2 shows a perspective view through the wing of an aircraft shown in FIG. 1 (with the actual spoiler and fixed wing omitted for clarity), with the spoiler hinge seal shown in the position that it would assume when the spoiler is in its fully raised position and in which the spoiler hinge seal of the invention is sealing the gap between the fixed wing and the top skin of the spoiler.

Although the description primarily makes reference to a hinge seal applied between a spoiler and a fixed wing of an aircraft, it is equally applicable to ailerons to improve aero efficiency and reduce noise. It may also be applied to flap hinge fairings to improve aero efficiency (reduced drag in high lift) and reduce noise. Referring now to the drawings, there is shown in FIG. 1 a cross-sectional view through a portion of a fixed wing 1 of an aircraft to which a spoiler 2 is mounted. The fixed wing 1 has a plurality of internal structural ribs 3 (one of which is shown in FIGS. 1 and 2) spaced from each other along the length of the wing 1 and to which each spoiler 2 is pivotally mounted for movement about a pivot point A. In FIG. 1, the spoiler 2 is shown in its fully raised position (around 55 degrees) to spoil lift. The fixed wing 1 has an upper skin 4 which is spaced from the rib 3 to provide a gap 5 between the skin 4 and the rib 3.

A resiliently deformable sealing element or elongate strip 6 has a first end 6a which is firmly attached to the upper skin surface 2a of the spoiler 2 and has a second end 6b that extends beyond a leading edge 2b of the spoiler 2 and into the gap 5 between the upper skin 4 and the rib 3. A secondary sealing element 7 is mounted to the upper skin 4 of the fixed wing 1 and protrudes from the trailing edge 4a of said upper skin 4. The sealing element 7 may be mounted to the upper skin 4 with a preload so that a tip 7a of the secondary sealing element 7 is biased downwardly and into contact with the upper surface 6c (see FIG. 2) of the sealing element 6. As shown in FIG. 2, the secondary sealing element 7 may extend from a support plate 7b that is rigidly attached flush to the upper surface of the fixed wing 1. The secondary sealing element 7 may be pivotally mounted to the support plate 7b for rotation about a hinge line L.

The underside of the secondary sealing element 7 may be treated with a friction reducing material or finish to reduce wear in the region of the tip 7a.

The opposite, second, end 6b of the sealing element 6 that extends into gap 5 is not fixed but may be guided by a guide roller or runner 8 mounted to the upper end 3a of the rib 3 and which makes contact with the underside surface 6d of the sealing element 6. The runner 8 may be formed from a nylon material to minimise friction between it and the underside 6d of the sealing element 6. The free or second end 6b of the sealing element 6 is provided with a 'ball-nose' element 9 to allow for easier sliding and to eliminate the risk of the sealing element 6 breaking through or digging into the underside of the upper skin 4. For example, the ball nose 9 could be formed from nylon 66 or a similar material with low friction, tufnol or similar wear strips could be incorporated into the underside of the top skin 4 and/or top side 3a of the hinge rib 3.

The sealing element 6 and secondary sealing element 7 together form a dynamic sliding seal to eliminate any gap between the upper skin 4 of the fixed wing 1 and the top skin 2a of the spoiler 2, as the upper surface 6c of the sealing element 6 is in constant contact with the tip 7a of the secondary sealing element 7, irrespective of the angular position of the spoiler 2 relative to the fixed wing 1.

Figure 3:
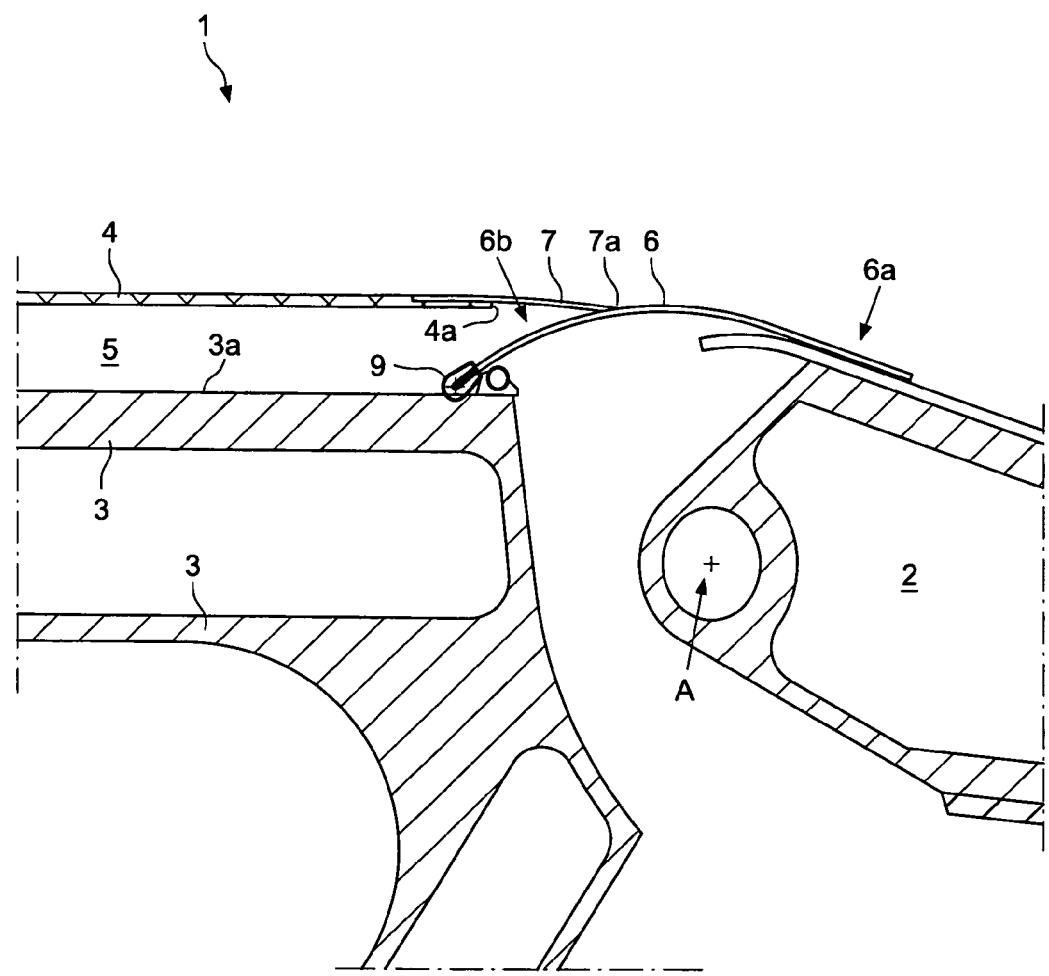
FIG. 3 shows a the same partial cross-sectional view as FIG. 1, but with the spoiler shown in its fully drooped position to increase lift.

FIG. 3 shows the same view as FIG. 1, but after the spoiler 2 has rotated about axis A into its maximum droop position to aid lift. As can be seen in FIG. 3, the tip 7 of the secondary sealing element 7 has slid across the upper surface 6a of the sealing element 6 as the sealing element 6 resiliently deforms as the spoiler rotates between its raised and drooped positions, thereby maintaining a sliding seal between the sealing element 6 and the secondary sealing element 7 throughout the range of movement of the spoiler 2.

During movement of the spoiler 2, the sealing element 6 changes shape and its underside 6d slides over the runner 8. Similarly, the ball nose 9 slides against the underside of the top surface 4 of the fixed skin 1 and along the upper surface of the rib 3.

It should be noted that the secondary sealing element 7 attached to the trailing edge 4a of the fixed wing 1 is a preferred feature and it is envisaged that adequate sealing may be achieved without it, in which case the upper surface 6a of the sealing element 6 will be configured such that contact is maintained between the trailing edge 1a of the fixed wing 1 and the upper surface 6a of the sealing element 6 throughout the range of movement of the spoiler 2.

The sealing element 6 and secondary sealing element 7 may each be formed from any material that exhibits the required degree of resilience and which is capable of taking on and holding a pre-loaded form. For example, a metallic material, such as high chromium heat treated stainless steel similar to that used for clock springs and sprung maching guarding may be appropriate. Alternatively, a thin composite material with high flexibility may be employed as a composite material would cope well with the environmental conditions including acoustic buffering and low pressure.

Although lubrication between the sealing element 6 and secondary sealing element 7 may be used, to increase seal life, dry lubrication is preferred, as wet lubrication could encourage sand and other particles to stick to lubricated surfaces. The sealing element 6 could also be provided with a low friction coating such as a thin-layer of PTFE, at least on its upper surface 6a.

Figure 4:
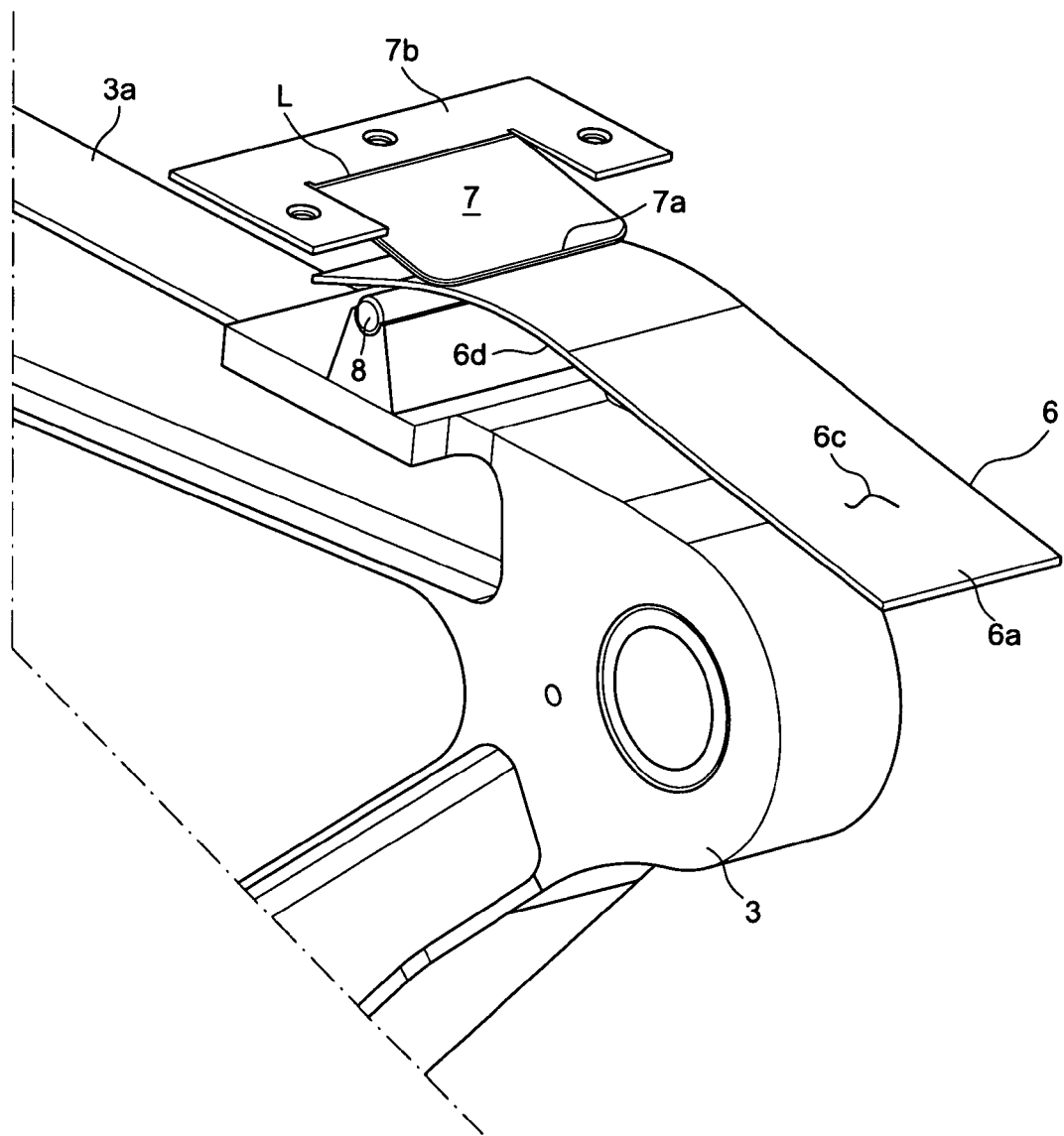
FIG. 4 shows a perspective view through the wing of an aircraft shown in FIG. 3 (but with the actual spoiler and fixed wing omitted for clarity), with the spoiler shown in the position that it would assume when the spoiler is in its fully drooped position and in which the spoiler hinge seal seals the gap between the fixed wing and the top skin of the spoiler.

It will be appreciated that the fixed wing 1 and spoiler 2 have been omitted from FIGS. 2 and 4 for the purposes of clarity, although it will be appreciated that the support plate 7b is mounted to the upper surface of the fixed wing 1 so that the secondary sealing element 7 protrudes from its trailing edge towards the spoiler 2, whereas the sealing element 6 is mounted to the upper surface of the spoiler 2 and extends into the space 5 between the upper surface 3b of the rib 3 and the underside of the fixed wing 1.

Figure 5:
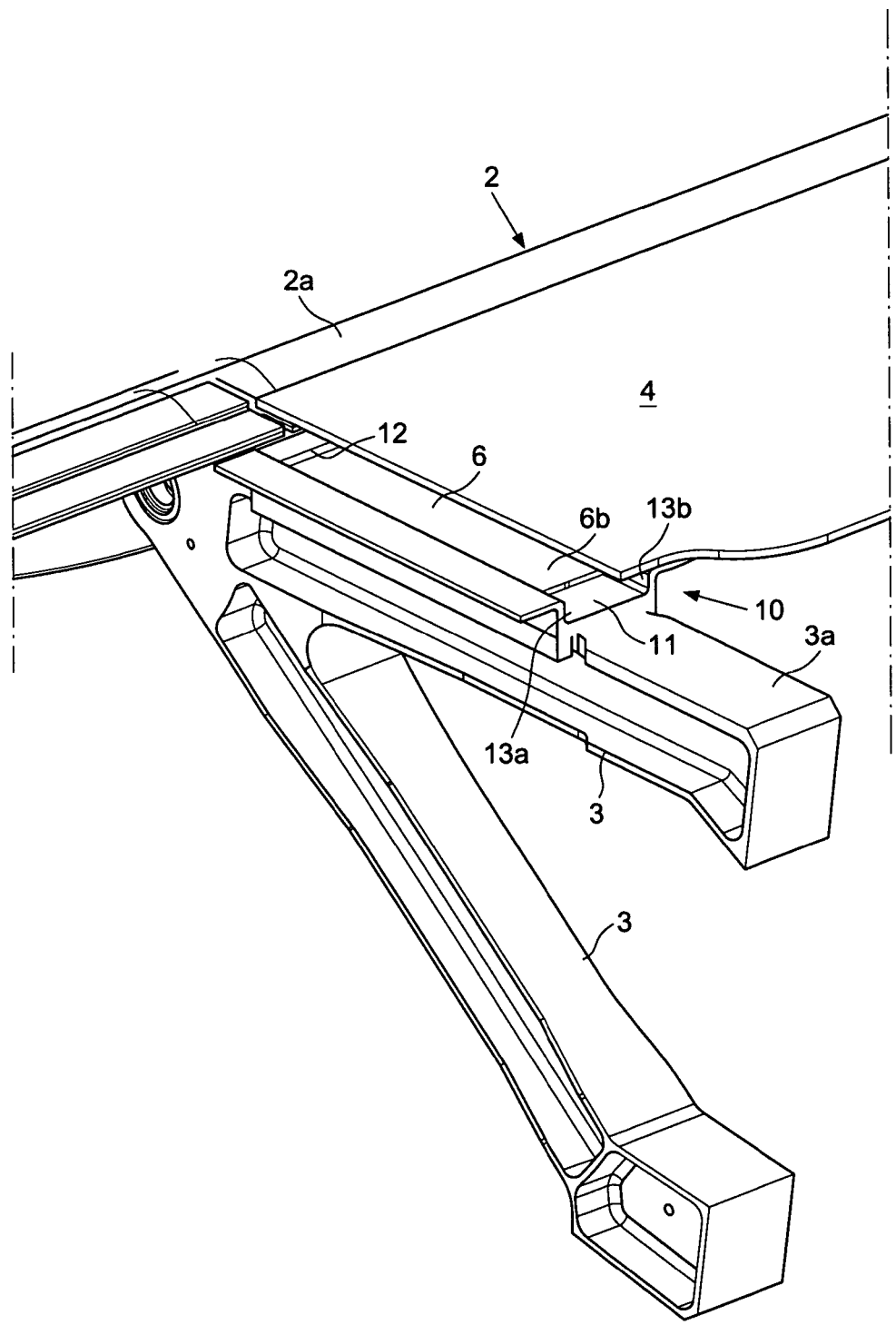
FIG. 5 is a second embodiment which shows a cut-away perspective view of a region around the rib of an aircraft wing to which a spoiler is pivotally mounted, the rib having a guide element to guide movement of the spoiler hinge seal as the spoiler pivots
Figure 6:
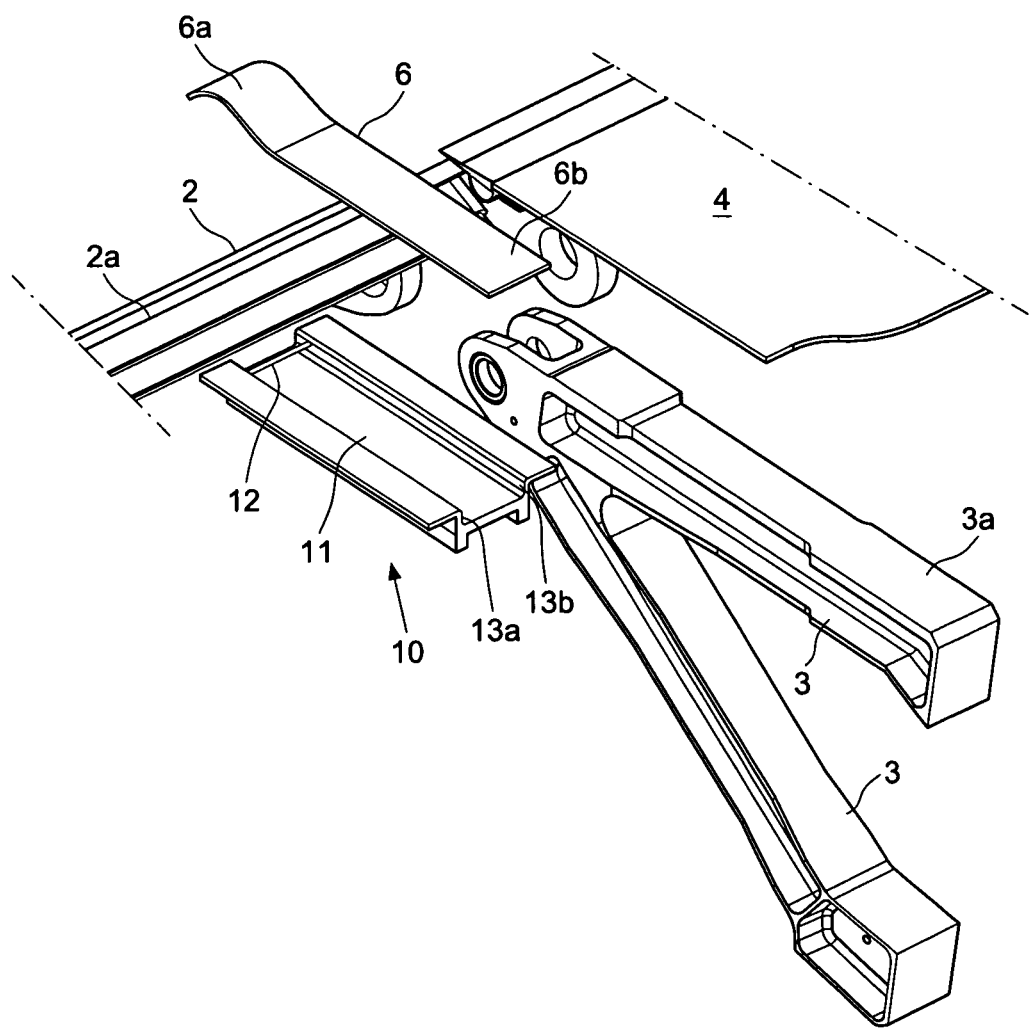
FIG. 6 shows an exploded view of the region shown in FIG. 5.

A modified embodiment of the invention will now be described with reference to FIGS. 5 and 6. This embodiment works on exactly the same principle as the previous embodiment, except that the bull nose at the free end of the sealing element 6 is omitted and the blade runner is replaced with a guide element 10 that is mounted on the upper surface 3a of the rib 3 of the fixed wing 1 and which has a elongate channel 11 which is slightly wider than the width of the of the sealing element 6 to slidingly receive the free end 6b of the sealing element 6. The sealing element 6 passes below a guide pin 12 mounted parallel to but above the bottom surface of the channel 11 and which extends between the side walls 13a,13b of the channel 11 so that the sealing element 6 travels along the channel 11 between the guide pin 12 and the base of the channel when the spoiler 2 rotates upwardly, so that the sealing element 6 slides along the channel 11. As the sealing element 6 passes beneath the guide pin 12, it is generally deformed and becomes flattened so that the sealing element 6 stays between the side walls 13a, 13b of the elongate channel 11.

It will be appreciated that the embodiments of the invention described above are preferred embodiments only and the invention also covers various modifications falling within the scope of the appended claims.

The invention claimed is:

1. An aircraft hinge sealing element comprising a deformable elongate, and resiliently flexible strip, said strip having an upper face to contact a trailing edge of a fixed skin of an aircraft wing and one end attached to a moveable aero surface structure, said surface structure pivotally mounted on a rib of said aircraft wing, said surface structure having a leading edge, wherein said strip extends from an upper surface of said surface structure beyond said leading edge and into a space between the trailing edge of the fixed skin and the rib of the aircraft wing, said strip ending at a second, free end, the strip configured to deform during pivotal movement of the surface structure to maintain contact between the upper face of the flexible strip and the trailing edge of the fixed skin and substantially prevent airflow in said space.

2. A hinge sealing element according to claim 1, formed from plastic.

3. A hinge sealing element according to claim 1, formed from metal.

4. A hinge sealing element according to claim 3, formed from a high chromium heat treated stainless steel.

5. A hinge sealing element according to claim 1, formed from a composite material.

6. An assembly including the hinge sealing element according to claim 1, to substantially prevent airflow between said leading edge of said moveable aero surface structure and said trailing edge of said fixed skin of said aircraft wing in the vicinity of the rib to which the moveable aero surface structure is pivotally mounted.

7. An assembly according to claim 6, wherein the assembly comprises a guide element mountable on an upper surface of said rib to guide sliding movement of the hinge sealing element in said space during pivotal movement of the moveable aero surface structure.

8. An assembly according to claim 7, wherein the guide element comprises a roller mounted for rotation in a supporting structure on the upper surface of said rib, said roller positioned to contact the underside of the hinge sealing element.

9. An assembly according to claim 6, comprising a cap attached to the free end of the hinge sealing element to reduce friction between the sealing element and the fixed wing where the free end of the hinge sealing element contacts the fixed wing during pivotal movement of the moveable aero surface structure.

10. An assembly according to claim 7, wherein the guide element comprises an elongate channel member on the upper surface of the rib, said channel configured to slideably receive the free end of the hinge sealing element.

11. An assembly according to claim 10, wherein the channel member comprises a guide pin positioned so that the sealing element slides into the channel beneath the guide pin.

12. An assembly according to claim 6, wherein the fixed wing includes a secondary sealing element protruding from said trailing edge, said secondary sealing element is biased into contact with an upper surface of the hinge sealing element forming a sliding seal therebetween.

13. A wing for an aircraft including the assembly according to claim 6, including said fixed wing portion and a moveable aero surface structure pivotally mounted to said fixed wing portion.

14. A wing according to claim 13, wherein said moveable aero surface structure is a spoiler.

15. A wing according to claim 13, wherein said moveable aero surface structure is an aileron.

16. A wing according to claim 13, wherein said moveable aero surface structure is a flap hinge fairing.

* * * * *